(12) United States Patent
Shang

(10) Patent No.: US 10,051,607 B2
(45) Date of Patent: Aug. 14, 2018

(54) DATA PROCESSING METHOD, APPARATUS AND SYSTEM

(71) Applicant: HUAWEI TECHNOLOGIES CO., LTD., Shenzhen, Guangdong (CN)

(72) Inventor: Xinghong Shang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 15/219,502

(22) Filed: Jul. 26, 2016

(65) Prior Publication Data

US 2016/0338015 A1   Nov. 17, 2016

Related U.S. Application Data

(63) Continuation of application No. PCT/CN2015/071554, filed on Jan. 26, 2015.

(30) Foreign Application Priority Data

Jan. 26, 2014   (CN) .......................... 2014 1 0036975

(51) Int. Cl.
*H04W 72/02*   (2009.01)
*H04W 48/08*   (2009.01)
(Continued)

(52) U.S. Cl.
CPC ........... *H04W 72/02* (2013.01); *H04L 61/255* (2013.01); *H04W 48/08* (2013.01); *H04W 84/12* (2013.01); *H04W 88/06* (2013.01)

(58) Field of Classification Search
CPC ..... H04W 72/02; H04W 48/08; H04W 84/12; H04W 88/06; H04L 61/255
See application file for complete search history.

(56) References Cited

U.S. PATENT DOCUMENTS 8,769,647 B2   7/2014 Liang et al.
2002/0194385 A1   12/2002 Linder et al.
(Continued)

FOREIGN PATENT DOCUMENTS

CN   1526247 A   9/2004
CN   101562814 A   10/2009
(Continued)

OTHER PUBLICATIONS

Chinese Notice of Allowance dated Apr. 18, 2017 in corresponding Chinese Patent Application No. 201410036975.X.
(Continued)

*Primary Examiner* — Lester Kincaid
*Assistant Examiner* — William Wang
(74) *Attorney, Agent, or Firm* — Staas & Halsey LLP

(57) ABSTRACT

Embodiments of the present invention relate to the communications field and provide a data processing method, an apparatus and a system, which can improve generality of a network concurrent function on an intelligent terminal. The data processing method includes: accessing a wireless local area network; establishing a first access point name APN, where the first APN is different from a default APN of the intelligent terminal, and the first APN is used to implement data service access to a cellular network when the wireless local area network is accessed; accessing the cellular network by using the first APN; and performing, in the wireless local area network and the cellular network accessed by using the first APN, transmission of a data service of the intelligent terminal. The data processing method, the apparatus and the system provided in the embodiments of the present invention are used to process data.

15 Claims, 6 Drawing Sheets

(51) Int. Cl.
*H04L 29/12* (2006.01)
*H04W 84/12* (2009.01)
*H04W 88/06* (2009.01)

(56) References Cited

U.S. PATENT DOCUMENTS

2013/0265879 A1   10/2013   Qiang
2014/0023041 A1*  1/2014   Zhao .................. H04W 36/0011
                                                        370/331

FOREIGN PATENT DOCUMENTS

| CN | 102595502 A | 7/2012 |
| CN | 103338482 A | 10/2013 |
| CN | 103441996 A | 12/2013 |
| CN | 103533609 A | 1/2014 |
| CN | 103533668 A | 1/2014 |
| CN | 103763754 A | 4/2014 |
| EP | 2 503 827 A1 | 9/2012 |
| WO | WO 2008/052580 A1 | 5/2008 |

OTHER PUBLICATIONS

International Search Report dated Apr. 28, 2015 in corresponding International Application No. PCT/CN2015/071554.
Extended European Search Report dated Jan. 19, 2017 in corresponding European Patent Application No. 15740929.3.
International Search Report and Written Opinion dated Apr. 28, 2015 in corresponding International Patent Application No. PCT/CN2015/071554.
Chinese Office Action dated Jun. 22, 2016 in corresponding Chinese Patent Application No. 201410036975.X.
"3$^{rd}$ Generation Partnership Project; Technical Specification Group Services and System Aspects; Architecture enhancements for non-3GPP accesses (Release 12)", 3GPP TS 23.402 V12.3.0, 3$^{rd}$ Generation Partnership Project, Dec. 2013, Valbonne, France, pp. 1-288.

* cited by examiner

DATA PROCESSING METHOD, APPARATUS AND SYSTEM

CROSS-REFERENCE TO RELATED APPLICATIONS

This application is a continuation of International Application No. PCT/CN2015/071554, filed on Jan. 26, 2015, which claims priority to Chinese Patent Application No. 201410036975.X, filed on Jan. 26, 2014, both of which are hereby incorporated by reference in their entireties.

TECHNICAL FIELD

The present invention relates to the communications field, and in particular, to a data processing method, an apparatus and a system.

BACKGROUND

With the coming of a mobile Internet era and rapid popularization of an intelligent terminal, a user can enjoy a data service such as online video watching and online shopping by using an intelligent terminal. In this way, mobile data traffic generated by the intelligent terminal explosively increases, which brings unprecedented pressure to a cellular network, where the cellular network may be a communications network such as a network based on a 3rd generation mobile communication technology or a network based on a 4th generation mobile communication technology. In order to relieve pressure of the cellular network, a wireless local area network may be used as a supplement means of the cellular network. The cellular network and the wireless local area network are significantly different in aspects such as a coverage area, bandwidth, and mobility of a network and have a respective and unique advantage. Therefore, the cellular network and the wireless local area network may converge with each other to form a heterogeneous network, so as to achieve complementary advantages, and perform offloading on a data service of the cellular network, that is, one part of a data service of an intelligent terminal may be carried in the cellular network while the other part of the data service may be carried in the wireless local area network. However, currently, in a process of converging the cellular network and the wireless local area network, all data services of the intelligent terminal can be carried only in one network at one moment, for example, after an intelligent terminal accesses a wireless local area network, a data service that is of the intelligent terminal and is carried in a cellular network is disabled accordingly, and all applications such as a browser and a video service access the wireless local area network.

In the prior art, a user may first modify an operating system on a read-only memory (ROM) of an intelligent terminal, and acquire administrator rights of the intelligent terminal, so that after the intelligent terminal accesses a wireless local area network, a data service of a cellular network is not disabled, that is, the intelligent terminal has a network concurrent function. For the intelligent terminal, the cellular network and the wireless local area network may be concurrently used and form a heterogeneous network. Then an OpenFlow switching module and an OpenFlow control module are loaded to a kernel of the operating system of the intelligent terminal according to an OF (openflow) technology. Offloading policy control is performed on a data service of the intelligent terminal by using the OpenFlow control module, that is, one part of the data service of the intelligent terminal is carried in the cellular network, and the other part of the data service is carried in the wireless local area network. However, an intelligent terminal for implementing a heterogeneous network must be a customized intelligent terminal, which lacks generality.

SUMMARY

Embodiments of the present invention provide a data processing method, an apparatus and a system, which can improve generality of a network concurrent function on an intelligent terminal.

To achieve the foregoing objective, the following technical solutions are adopted in the embodiments of the present invention:

According to a first aspect, a data processing method is provided, which is applied to an intelligent terminal and includes:

accessing a wireless local area network;

establishing a first APN, where the first access point name APN is different from a default APN of the intelligent terminal, and the first APN is used to implement data service access to a cellular network when the wireless local area network is accessed;

accessing the cellular network by using the first APN; and performing, in the wireless local area network and the cellular network accessed by using the first APN, transmission of a data service of the intelligent terminal.

With reference to the first aspect, in a first implementable manner, before the performing, in the wireless local area network and the cellular network accessed by using the first APN, transmission of a data service of the intelligent terminal, the method further includes:

establishing a virtual interface, so that the data service can be transmitted, through the virtual interface, to a wireless local area network interface or a cellular network interface accessed by using the first APN; and setting an Internet Protocol IP routing table, where a default route recorded in the IP routing table is a private IP address of the virtual interface.

With reference to the first implementable manner, in a second implementable manner, the performing, in the wireless local area network and the cellular network accessed by using the first APN, transmission of a data service of the intelligent terminal includes:

routing the data service to the virtual interface according to the IP routing table;

determining a first data packet and a second data packet according to an offloading policy, where the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;

transmitting the first data packet from the virtual interface to the cellular network interface accessed by using the first APN, so that the first data packet is transmitted to the cellular network accessed by using the first APN through the cellular network interface accessed by using the first APN; and transmitting the second data packet from the virtual interface to the wireless local area network interface, so that the second data packet is transmitted to the wireless local area network through the wireless local area network interface.

With reference to the second implementable manner, in a third implementable manner, before the determining a first data packet and a second data packet according to an offloading policy, the method further includes:

acquiring a time for the cellular network, accessed by using the first APN, to respond to a first data service, where the first data service is any one of data services running on the intelligent terminal, and a data service type corresponding to the first data service is the data service type of the data service that currently needs to be transmitted by using the cellular network accessed by using the first APN; and if the time for the cellular network, accessed by using the first APN, to respond to the first data service is greater than or equal to a first threshold, updating the offloading policy, so that in an updated offloading policy, a data service type corresponding to the first data service is the data service type of the data service that currently needs to be transmitted by using the wireless local area network.

With reference to the second implementable manner, in a fourth implementable manner, before the determining a first data packet and a second data packet according to an offloading policy, the method further includes:

acquiring a time for the wireless local area network to respond to a second data service, where the second data service is any one of data services running on the intelligent terminal, and a data service type corresponding to the second data service is the data service type of the data service that currently needs to be transmitted by using the wireless local area network; and if the time for the wireless local area network to respond to the second data service is greater than or equal to a second threshold, updating the offloading policy, so that in an updated offloading policy, a data service type corresponding to the second data service is the data service type of the data service that currently needs to be transmitted by using the cellular network accessed by using the first APN.

With reference to any one of the first aspect and the first to the fourth implementable manners, in a fifth implementable manner, the performing, in the wireless local area network and the cellular network accessed by using the first APN, transmission of a data service of the intelligent terminal includes:

receiving, through the cellular network interface accessed by using the first APN, a data packet sent by the cellular network accessed by using the first APN;

receiving, through the wireless local area network interface, a data packet sent by the wireless local area network;

writing the data packet sent by the cellular network accessed by using the first APN into the virtual interface;

writing the data packet sent by the wireless local area network into the virtual interface; and routing a data packet received by the virtual interface to the corresponding data service process, where the data packet received by the virtual interface includes the data packet sent by the cellular network accessed by using the first APN and the data packet sent by the wireless local area network.

According to a second aspect, an intelligent terminal is provided, including:

a first accessing unit, configured to access a wireless local area network;

a first establishing unit, configured to establish a first access point name APN, where the first APN is different from a default APN of the intelligent terminal, and the first APN is used to implement data service access to a cellular network when the wireless local area network is accessed;

a second accessing unit, configured to access the cellular network by using the first APN; and a transmitting unit, configured to perform, in the wireless local area network and the cellular network accessed by using the first APN, transmission of a data service of the intelligent terminal.

With reference to the second aspect, in a first implementable manner, the intelligent terminal further includes:

a second establishing unit, configured to establish a virtual interface, so that the data service can be transmitted, through the virtual interface, to a wireless local area network interface or a cellular network interface accessed by using the first APN; and a setting unit, configured to set an Internet Protocol IP routing table, where a default route recorded in the IP routing table is a private IP address of the virtual interface.

With reference to the first implementable manner, in a second implementable manner, the transmitting unit is specifically configured to:

route the data service to the virtual interface according to the IP routing table;

determine a first data packet and a second data packet according to an offloading policy, where the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;

transmit the first data packet from the virtual interface to the cellular network interface accessed by using the first APN, so that the first data packet is transmitted to the cellular network accessed by using the first APN through the cellular network interface accessed by using the first APN; and transmit the second data packet from the virtual interface to the wireless local area network interface, so that the second data packet is transmitted to the wireless local area network through the wireless local area network interface.

With reference to the second implementable manner, in a third implementable manner, the intelligent terminal further includes:

a first acquiring unit, configured to acquire a time for the cellular network, accessed by using the first APN, to respond to a first data service, where the first data service is any one of data services running on the intelligent terminal, and a data service type corresponding to the first data service is the data service type of the data service that currently needs to be transmitted by using the cellular network accessed by using the first APN; and a first updating unit, configured to: if the time for the cellular network, accessed by using the first APN, to respond to the first data service is greater than or equal to a first threshold, update the offloading policy, so that in an updated offloading policy, a data service type corresponding to the first data service is the data service type of the data service that currently needs to be transmitted by using the wireless local area network.

With reference to the second implementable manner, in a fourth implementable manner, the intelligent terminal further includes:

a second acquiring unit, configured to acquire a time for the wireless local area network to respond to a second data service, where the second data service is any one of data services running on the intelligent terminal, and a data service type corresponding to the second data service is the data service type of the data service that currently needs to be transmitted by using the wireless local area network; and a second updating unit, configured to: if the time for the wireless local area network to respond to the second data service is greater than or equal to a second threshold, update the offloading policy, so that in an updated offloading policy, a data service type corresponding to the second data service is the data service type of the data service that currently needs to be transmitted by using the cellular network accessed by using the first APN.

With reference to the second aspect and the first to the fourth implementable manners, in a fifth implementable manner, the transmitting unit is specifically configured to:

receive, through the cellular network interface accessed by using the first APN, a data packet sent by the cellular network accessed by using the first APN;

receive, through the wireless local area network interface, a data packet sent by the wireless local area network;

write the data packet sent by the cellular network accessed by using the first APN into the virtual interface;

write the data packet sent by the wireless local area network into the virtual interface; and route a data packet received by the virtual interface to the corresponding data service process, where the data packet received by the virtual interface includes the data packet sent by the cellular network accessed by using the first APN and the data packet sent by the wireless local area network.

Embodiments of the present invention provide a data processing method, an apparatus and a system. The data processing method includes: accessing a wireless local area network; establishing a first access point name APN, where the first APN is different from a default APN of an intelligent terminal, and the first APN is used to implement data service access to a cellular network when the wireless local area network is accessed; accessing the cellular network by using the first APN; and performing, in the wireless local area network and the cellular network accessed by using the first APN, transmission of a data service of the intelligent terminal. In this way, after accessing a wireless local area network, an intelligent terminal establishes a first APN, accesses a cellular network by using the first APN, and performs, in the wireless local area network and the cellular network accessed by using the first APN, transmission of a data service. Compared with the prior art, a user may not modify an operating system on a read-only memory (ROM) of the intelligent terminal, and does not need to acquire administrator rights of the intelligent terminal, so that when the intelligent terminal connects to the wireless local area network, even if a connection, to the cellular network, established by using a default APN is disconnected, the intelligent terminal can still access the cellular network, which enables the intelligent terminal to have a network concurrent function, thereby improving generality of the network concurrent function on the intelligent terminal.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
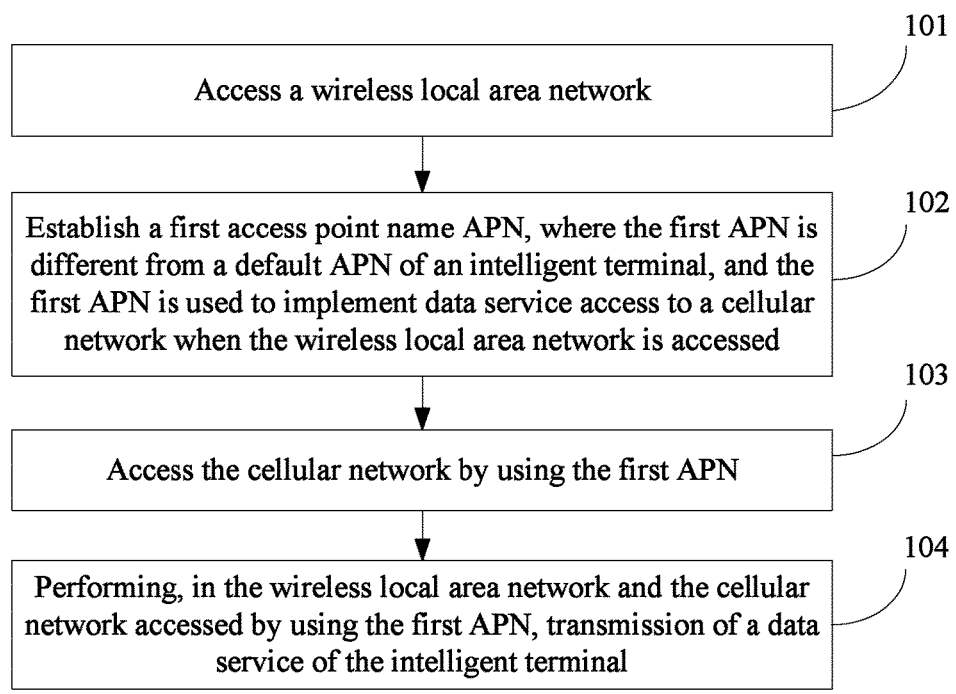
FIG. 1 is a flowchart of a data processing method according to an embodiment of the present invention.

An embodiment of the present invention provides a data processing method, which is applied to an intelligent terminal, and as shown in FIG. 1, includes:

Step 101: Access a wireless local area network.

In this embodiment of the present invention, it is assumed that the intelligent terminal first accesses a cellular network by using a default APN (Access Point Name, access point name) of the intelligent terminal, which implements transmission of a data service between the intelligent terminal and the cellular network. After the intelligent terminal accesses the wireless local area network, the data service that is of the intelligent terminal and is carried in the cellular network accessed by using the default APN is disabled accordingly, that is, a data service connection to the cellular network is disconnected, and the intelligent terminal performs transmission of the data service only by using the wireless local area network.

The APN is a parameter that needs to be set when a user surfs the Internet by using the intelligent terminal. The APN determines in which access manner the intelligent terminal of the user visits a network, and may be used to identify a service type of GPRS (General Packet Radio Service, general packet radio service). APNs are currently classified into two types to visit a WAP (Wireless Application Protocol, Wireless Application Protocol) service and a serving service except for the WAP service by using the GPRS. When APNs for accessing the cellular network are different, the cellular network provides different services for the intelligent terminal according to the corresponding APNs. For example, when the APN of the intelligent terminal is set to CMWAP, the intelligent terminal correspondingly visits China Mobile Monternet; when the APN of the intelligent terminal is set to CMNET, the intelligent terminal correspondingly visits the Internet. The APN is defined and described in detail in the 3GPP specification TS23.003 Clause 9, and details are not described again in this embodiment.

Step 102: Establish a first access point name APN, where the first APN is different from a default APN of the intelligent terminal, and the first APN is used to implement data service access to a cellular network when the wireless local area network is accessed.

Step 103: Access the cellular network by using the first APN.

Step 104: Perform, in the wireless local area network and the cellular network accessed by using the first APN, transmission of a data service of the intelligent terminal.

Before the transmission of the data service of the intelligent terminal is performed in the wireless local area network and the cellular network accessed by using the first APN, the intelligent terminal first establishes a virtual interface, simultaneously sets an IP (Internet Protocol, Internet Protocol) routing table, and sets a default route recorded in the IP routing table to a private IP address of the virtual interface. That is, the intelligent terminal sets a next-hop address recorded in the IP routing table to the private IP address of the virtual interface, where the next hop refers to a next hop of a route selected by a router, that is, a next address to which a data packet needs to be transmitted. The intelligent terminal routes the data service of the intelligent terminal to the virtual interface according to the IP routing table, so that the data service can be transmitted, through the virtual interface, to a wireless local area network interface or a cellular network interface accessed by using the first APN. The wireless local area network interface and the cellular network interface accessed by using the first APN are physical interfaces of the intelligent terminal. That the data service of the intelligent terminal is carried in the wireless local area network or the cellular network accessed by using the first APN needs to be determined according to an offloading policy, and offloading is performed according to a time for, the wireless local area network or the cellular network accessed by using the first APN, to respond to the data service of the intelligent terminal.

In this way, after accessing a wireless local area network, an intelligent terminal establishes a first access point name APN, accesses a cellular network by using the first APN, and performs, in the wireless local area network and the cellular network accessed by using the first APN, transmission of a data service. Compared with the prior art, a user may not modify an operating system on a read-only memory (ROM) of the intelligent terminal, and does not need to acquire administrator rights of the intelligent terminal, so that when the intelligent terminal connects to the wireless local area network, even if a connection, to the cellular network, established by using a default APN is disconnected, the intelligent terminal can still access the cellular network, which enables the intelligent terminal to have a network concurrent function, thereby effectively improving generality of the network concurrent function on the intelligent terminal.

Figure 2:
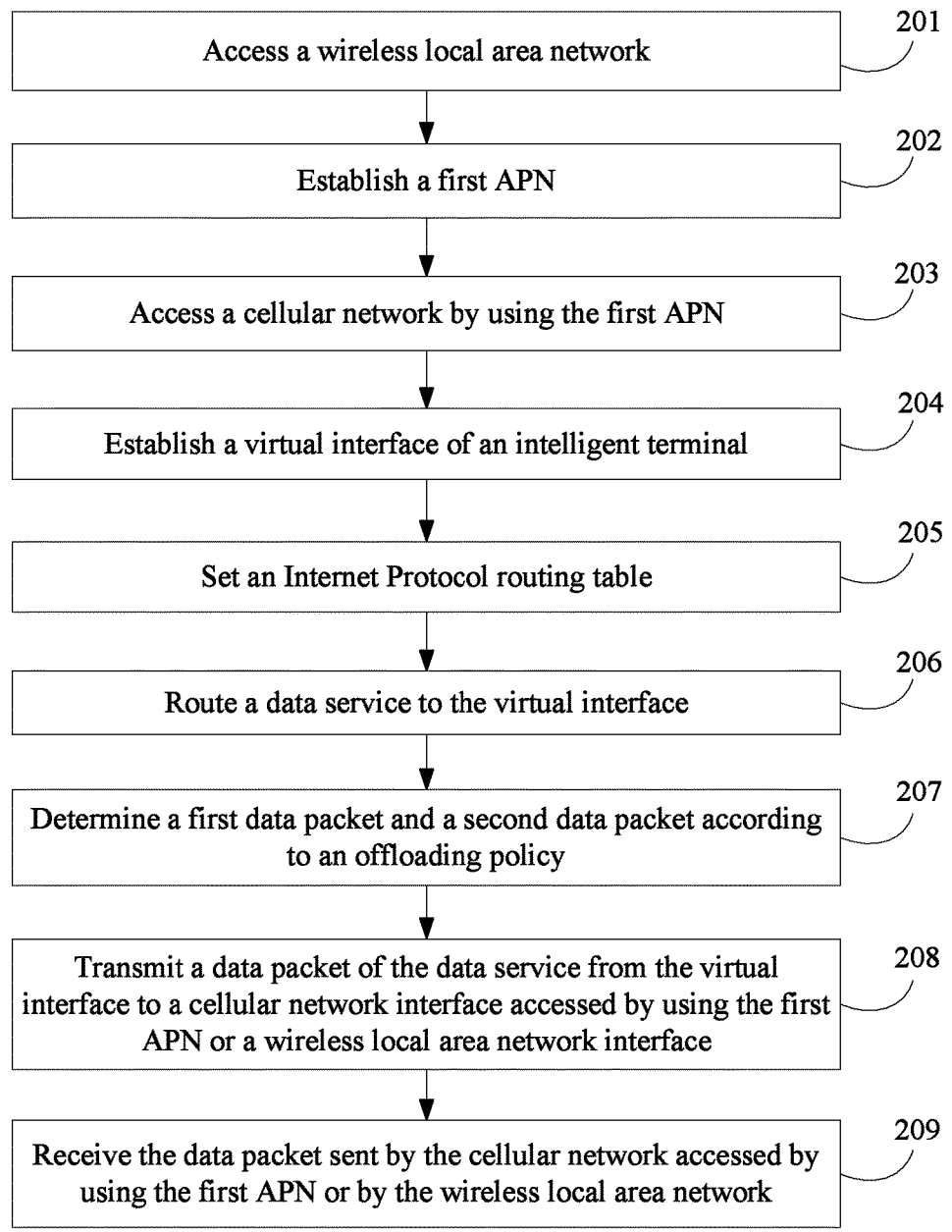
FIG. 2 is a flowchart of another data processing method according to an embodiment of the present invention.

An embodiment of the present invention provides a data processing method, which is applied to an intelligent terminal, and as shown in FIG. 2, includes:

Step 201: Access a wireless local area network.

When a user is located in an area covered by a wireless local area network, assuming that a user interface of the intelligent terminal is a touchscreen and the intelligent terminal has a function of accessing a wireless local area network, the user may tap to trigger a sign (for example, WiFi) that is for accessing a wireless local area network and is displayed on the user interface of the intelligent terminal. After the triggering is successful, the user interface of the intelligent terminal receives a triggering signal, and the intelligent terminal accesses the wireless local area network in the area that is covered by the wireless local area network and in which the user is located. In actual application, if the intelligent terminal has a key, the user may also press the key, so that the intelligent terminal accesses the wireless local area network. The intelligent terminal may also automatically access the wireless local area network. This embodiment of the present invention provides only an exemplary description and sets no limitation thereto.

Step 202: Establish a first APN.

The data processing method provided in this embodiment of the present invention is implemented by a specific application running on the intelligent terminal. In this embodiment of the present invention, assuming that the specific application is installed in the intelligent terminal and the specific application may be a client application, the user interface of the intelligent terminal displays an icon of the client application. When the user needs to enable the intelligent terminal to perform data transmission in a heterogeneous network, the user may trigger the icon of the client application displayed on the user interface of the intelligent terminal, so as to implement a network concurrent function of the intelligent terminal. After the triggering is successful, the intelligent terminal runs the client application, and establishes the first APN, where the first APN is different from a default APN of the intelligent terminal, and the first APN is used to implement data service access of a cellular network when the wireless local area network is accessed. The first APN may be an MMS APN (Multimedia Messaging Service Access Point Name, multimedia messaging service access point name), or may be an IMS APN (Internet Protocol Multimedia Subsystem Access Point Name, Internet Protocol multimedia subsystem access point name), a GPS APN (Global Positioning System Access Point Name, Global Positioning System access point name), or the like. In actual application, the MMS APN is generally used to access the cellular network. Generally, the default access point name APN may be China Unicom 3gnet, China Telecom Internet ctnet, China Mobile Internet cmnet, or the like. After successfully establishing the first APN, the intelligent terminal can access the cellular network by using the first APN, where the cellular network may be a cellular network using a 2nd generation technology or a cellular network using a 3rd generation technology, for example, GPRS, an EDGE (Enhanced Data Rate for Global System for Mobile Communications Evolution, Enhanced Data rate for Global System for Mobile Communications Evolution) network, a 3G (3rd-generation, 3rd generation mobile telecommunications technology) network, and an LTE (Long Term Evolution, Long Term Evolution) network.

Step 203: Access a cellular network by using the first APN.

When the user is located in an area covered by a cellular network, the intelligent terminal has a function of accessing a cellular network. After the intelligent terminal runs the client application and establishes the first APN, the intelligent terminal accesses the cellular network by using the first APN. The user may trigger a sign for accessing a cellular network displayed on the user interface of the intelligent terminal, so that the intelligent terminal accesses, by using the first APN, the cellular network of the area that is covered by the cellular network and in which the user is located, and performs a data access service. In this case, the intelligent terminal simultaneously accesses the wireless local area network and the cellular network accessed by using the first APN, that is, a function of the wireless local area network and a function of the cellular network are concurrent on the intelligent terminal, and transmission of a data service of the intelligent terminal is performed in the wireless local area network and the cellular network accessed by using the first APN.

Step 204: Establish a virtual interface of the intelligent terminal.

An operating system function API (Application Programming Interface, application programming interface) of the intelligent terminal is called by using the client application installed in the intelligent terminal, so as to establish the virtual interface in a kernel mode. The virtual interface is used to transmit, through the virtual interface, a data packet of the data service of the intelligent terminal to a wireless local area network interface or a cellular network interface accessed by using the first APN. The wireless local area network interface is implemented by a wireless local area network WiFi chip and a drive and is a physical interface for the intelligent terminal to access the wireless local area network. The cellular network interface is implemented by a radio frequency chip and the like and is a physical interface for the intelligent terminal to access the cellular network. Moreover, an IP address of the virtual interface is set to a private IP address. Generally, the private IP address may be an A type, a B type, or a C type private IP address. A range of the A type private IP addresses is 10.0.0.0-10.255.255.255/8; a range of the B type private IP addresses is 172.16.0.0-172.31.255.255/12; a range of the C type private IP addresses is 192.168.0.0-192.168.255.255/16. In actual application, in this embodiment of the present invention, any private IP address within the range of the C type private IP addresses may be used, and different intelligent terminals may use a same private IP address within the range of the C type private IP addresses.

Step 205: Set an Internet Protocol IP routing table.

The intelligent terminal sets the IP address of the virtual interface to the private IP address and then sets the IP routing table. That is, a default route recorded in the IP routing table is set to the private IP address of the virtual interface, that is, a next-hop address recorded in the IP routing table is set to the private IP address of the virtual interface.

Step 206: Route a data service to the virtual interface.

The user may tap to trigger an application icon displayed on the user interface of the intelligent terminal. The intelligent terminal receives a triggering signal, starts a corresponding application process, and generates a data service, where the application process may be a video type application process, an instant chatting type application process, or the like, and the user may watch a video or chat by using the intelligent terminal. For example, as show in FIG. 3, after a data service generated by an application process 301, for example, an application such as the Youku video, is encapsulated by using a TCP/IP (Transmission Control Protocol/Internet Protocol, Transmission Control Protocol/Internet Protocol) protocol stack 302, a data packet that is of the data service and is in an IP form is obtained. The data packet that is of the data service and is in the IP form is routed to a virtual interface 303 according to the next-hop address recorded by the IP routing table. In this case, the virtual interface 303 receives a data packet that is of the data service and is in the IP form from different applications; then a character device drive 304 reads, from the virtual interface 303, the data packet that is of the data service and is in the IP form; and a client application 305 reads, from the character device drive 304, the data packet that is of the data service and is in the IP form. The data packet that is of the data service and is in the IP form enters a user mode from a kernel mode, where the kernel mode is an execution mode in which the user has no privilege for operating the intelligent terminal, and the user mode is an execution mode in which the user has a privilege for operating the intelligent terminal. When the user mode is executed, memory space and an object that the process can access are limited, and a processor occupied by the process can be preempted; however, when the kernel mode is executed, all memory space and objects can be accessed, and preemption on a processor occupied by the process is not allowed. The client application 305 then offloads the data packet of the data service according to an offloading policy, so that the data packet of the data service is transmitted to the wireless local area network through a wireless local area network interface 307, or the data packet of the data service is transmitted to the cellular network accessed by using the first APN through a cellular network interface 306 accessed by using the first APN.

Step 207: Determine a first data packet and a second data packet according to an offloading policy.

The offloading policy records a data service type of a data service that currently needs to be transmitted by using the cellular network accessed by using the first APN and a data service type of a data service that currently needs to be transmitted by using the wireless local area network. The intelligent terminal can determine the first data packet and the second data packet according to the offloading policy, where the first data packet is a data packet that needs to be transmitted by using the cellular network accessed by using the first APN, and the second data packet is a data packet that needs to be transmitted by using the wireless local area network.

Figure 4:
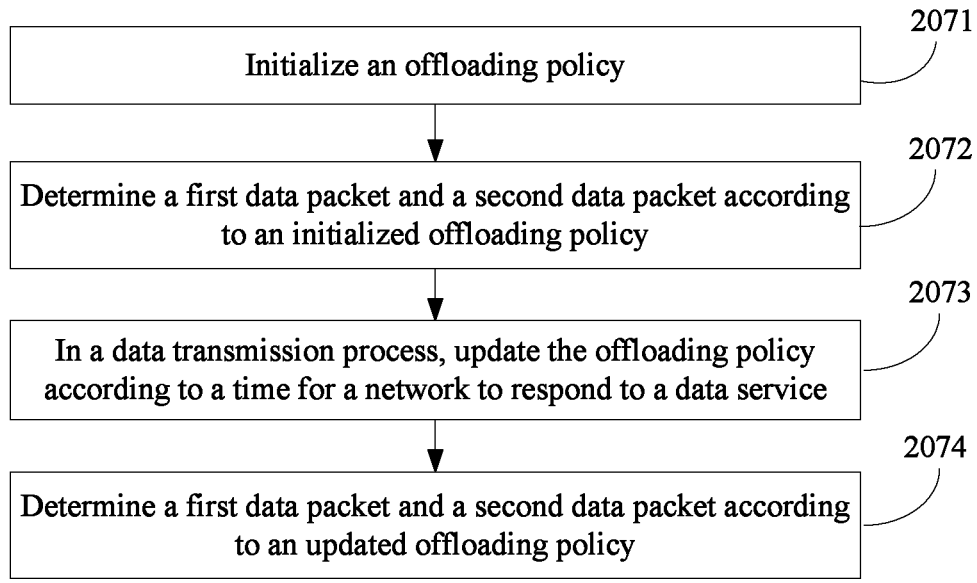
FIG. 4 is a flowchart of still another data processing method according to an embodiment of the present invention.

For example, that the first data packet and the second data packet are determined according to the offloading policy, as shown in FIG. 4, specifically includes the following steps:

Step 2071: Initialize an offloading policy.

The offloading policy records the data service type of the data service that initially needs to be transmitted by using the cellular network accessed by using the first APN and the data service type of the data service that initially needs to be transmitted by using the wireless local area network. The data service type includes a browser application type, a chatting application type, a video application type, and the like.

For example, assuming that a first data service is a data service generated by a video type application, and a second data service is a data service generated by a chatting type application, if the intelligent terminal transmits the video type data service by using the cellular network accessed by using the first APN and transmits the chatting type data service by using the wireless local area network, the offloading policy is initialized, that is, the offloading policy records that the video type data service is transmitted by using the cellular network accessed by using the first APN and that the chatting type data service is transmitted by using the wireless local area network.

Step 2072: Determine the first data packet and the second data packet according to an initialized offloading policy.

Specifically, assuming that the first data service is a data service generated by the Youku video application, and the second data service is a data service generated by the WeChat application, if the intelligent terminal transmits the data service of the Youku video application by using the cellular network accessed by using the first APN and transmits the data service of the WeChat application by using the wireless local area network, the offloading policy is initialized, that is, the offloading policy records that the data service of the Youku video application is transmitted by using the cellular network accessed by using the first APN and that the data service of the WeChat application is transmitted by using the wireless local area network. The first data packet and the second data packet are determined according to the initialized offloading policy. The first data packet is a data packet of the Youku video application and needs to be transmitted by using the cellular network accessed by using the first APN; the second data packet is a data packet of the WeChat application and needs to be transmitted by using the wireless local area network.

Step 2073: In a data transmission process, update the offloading policy according to a time for a network to respond to a data service.

A time for the cellular network, accessed by using the first APN, to respond to the first data service is acquired, where a data service type corresponding to the first data service is the data service type of the data service that currently needs to be transmitted by using the cellular network accessed by using the first APN. If the time for the cellular network, accessed by using the first APN, to respond to the first data service is greater than or equal to a first threshold, the offloading policy is updated, so that in an updated offloading policy, a data service type corresponding to the first data service is the data service type of the data service that currently needs to be transmitted by using the wireless local area network. The first threshold is a longest time for responding to the first data service by the cellular network accessed by using the first APN, and generally, the first threshold may be 5 seconds.

A time for the wireless local area network to respond to the second data service is acquired, where a data service type corresponding to the second data service is the data service type of the data service that currently needs to be transmitted by using the wireless local area network. If the time for the wireless local area network to respond to the second data service is greater than or equal to a second threshold, the offloading policy is updated, so that in an updated offloading policy, a data service type corresponding to the second data service is the data service type of the data service that currently needs to be transmitted by using the cellular network accessed by using the first APN. The second threshold is a longest time for the wireless local area network to respond to the second data service, and generally, the second threshold may be 10 seconds.

It should be noted that, the updating process may be periodically performed, or may be randomly performed.

For example, it is assumed that the intelligent terminal acquires a time for the cellular network, accessed by using the first APN, to respond to the data service generated by the Youku video application. If the time for the cellular network, accessed by using the first APN, to respond to the data service of the Youku video application is greater than or equal to the first threshold, where the first threshold may be a longest time for the cellular network, accessed by using the first APN, to respond to the data service of the Youku video, and generally, the first threshold may be 5 seconds, the intelligent terminal may display a dialog box indicating whether to disable the Youku video application. The user may independently determine whether to disable the Youku video application and restart a Youku video application process. Alternatively, when the Youku video application is not disabled, the intelligent terminal can acquire again a new link to a website that provides a Youku video service, that is, the intelligent terminal may automatically acquire a Youku video again, and the user may watch the Youku video again. In addition, if the website that provides the Youku video has function of storing a Cookie (Cookie) in a local terminal of the user, the user may continue watching the Youku video from a current watching progress. The Cookie refers to data that is stored in a local intelligent terminal of a user so as to distinguish a user identity and track a session, and sometimes is also in a plural form, that is, Cookies. The intelligent terminal updates the offloading policy according to the acquired time for the cellular network, accessed by using the first APN, to respond to the data service of the Youku video, so that in the updated offloading policy, the data service of the Youku video needs to be transmitted by using the wireless local area network. It should be noted that, if the acquired time for the cellular network, accessed by using the first APN, to respond to the data service of the Youku video is less than the first threshold, the data service of the Youku video continues being transmitted by using the cellular network accessed by using the first APN.

It is assumed that the intelligent terminal acquires a time for the wireless local area network to respond to the data service generated by the WeChat application. If the user performs a voice chat by using WeChat in a moving process, and in this case, the user may not be within a network coverage range of the wireless local area network, the time for the wireless local area network to respond to the data service of WeChat is greater than or equal to the second threshold. The second threshold may be a longest time for the wireless local area network to respond to the data service of WeChat, and generally, the second threshold is 10 seconds. The intelligent terminal may display a dialog box indicating whether to disable the WeChat application. The user may independently choose to determine whether to disable the WeChat application and restart a WeChat application process. If the intelligent terminal updates the offloading policy according to the acquired time for the wireless local area network to respond to the data service of WeChat, so that in the updated offloading policy, the data service of WeChat needs to be transmitted by using the cellular network accessed by using the first APN, then in a case in which the WeChat application is not disabled, the intelligent terminal can acquire a link to the cellular network accessed by using the first APN, and also acquire again a new link to a server that provides the WeChat application. It should be noted that, if the acquired time for the wireless local area network to respond to the data service of WeChat is less than the second threshold, the data service of WeChat continues being transmitted by using the wireless local area network.

Step 2074: Determine a first data packet and a second data packet according to an updated offloading policy.

For example, the first data packet and the second data packet are determined according to the updated offloading policy. Assuming that the first data packet is a data packet of the WeChat application, the first data packet needs to be transmitted by using the cellular network accessed by using the first APN; assuming that the second data packet is a data packet of the Youku video application, the second data packet needs to be transmitted by using the wireless local area network. The updated offloading policy records that the data service of the Youku video is transmitted by using the wireless local area network, and that the data service of the WeChat application is transmitted by using the cellular network accessed by using the first APN.

Step 208: Transmit a data packet of the data service from the virtual interface to a cellular network interface accessed by using the first APN or a wireless local area network interface.

Figure 3:
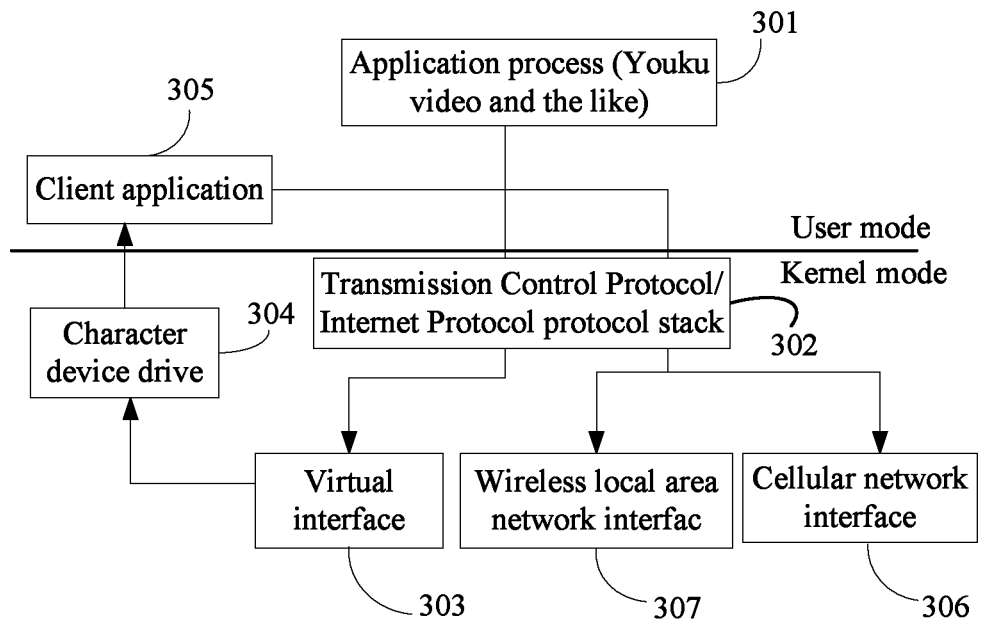
FIG. 3 is a flowchart of data sending according to an embodiment of the present invention.

Assuming that the data packet that is of the data service and is read by the client application from the character device drive includes the data packet of the WeChat application and the data packet of the Youku video application, a current data packet of the Youku video application is a data packet that needs to be transmitted by using the wireless local area network, and a current data packet of the WeChat application is a data packet that needs to be transmitted by using the cellular network accessed by using the first APN. As shown in FIG. 3, the intelligent terminal establishes a socket (socket) interface for the data service of WeChat, and binds the socket interface to the cellular network interface 306 accessed by using the first APN. Then the character device drive 304 reads the data packet of the WeChat application from the virtual interface 303, and the client application 305 reads the data packet of the WeChat application from the character device drive 304, where the data packet of the WeChat application enters the user mode from the kernel mode; transmits the data packet of the WeChat application to the cellular network interface 306 accessed by using the first APN, and then sends, by using a data proxy (Proxy) in a socket manner, the data packet of the WeChat application to the cellular network accessed by using the first APN.

The intelligent terminal establishes a socket interface for the data service of the Youku video, and binds the socket interface to the wireless local area network interface 307. Then the character device drive 304 reads the data packet of the Youku video application from the virtual interface 303, and the client application 305 reads the data packet of the Youku video application from the character device drive 304, where the data packet of the Youku video application enters the user mode from the kernel mode; transmits the data packet of the Youku video application to the wireless local area network interface 307, and then sends the data packet of the Youku video application to the wireless local area network by using a data proxy (Proxy) in a socket manner.

In this way, the intelligent terminal updates the offloading policy according to the time for, the wireless local area network or the cellular network accessed by using the first APN, to respond to the data service, and offloads the data service again according to an updated offloading policy. Compared with the prior art, the intelligent terminal performs offloading on the data service according to the offloading policy, which can implement intelligence and refinement of data service transmission on the wireless local area network or the cellular network accessed by using the first APN.

Step 209: Receive the data packet sent by the cellular network accessed by using the first APN or by the wireless local area network.

Figure 5:
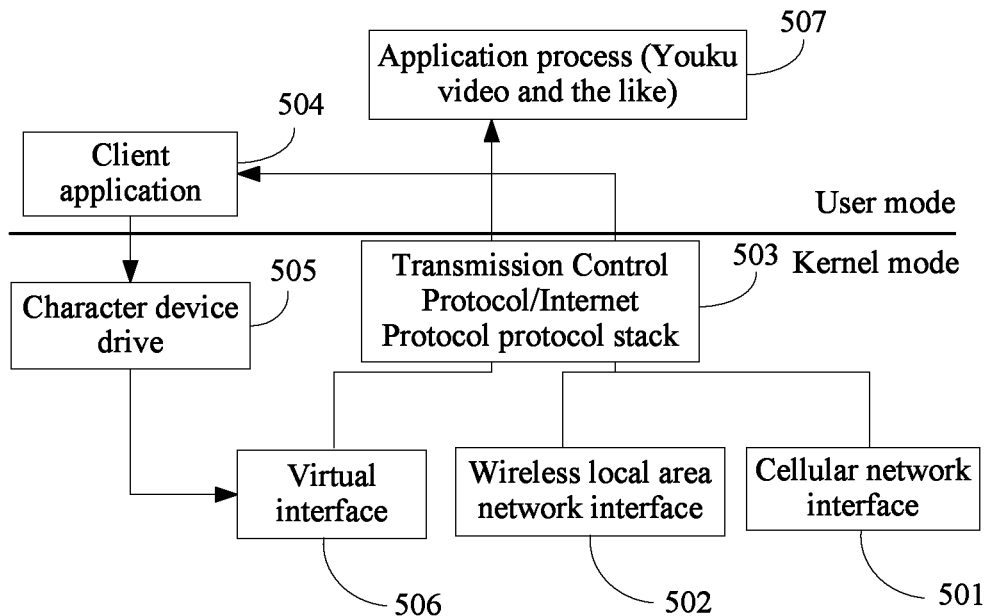
FIG. 5 is a flowchart of data receiving according to an embodiment of the present invention.

As shown in FIG. 5, it is assumed that the data packet that is of the WeChat application and is sent by the cellular network accessed by using the first APN is received through a cellular network interface 501 accessed by using the first APN, and a client application 504 acquires the data packet of the WeChat application through a socket (socket) interface established in the cellular network accessed by using the first APN. In actual application, a client application acquires data packets of different applications by using socket interfaces established in different networks. The client application 504 converts, by using a data proxy (Proxy), the data packet of the WeChat application into a data packet that is of the WeChat application and is in an IP form. The client application 504 writes the data packet that is of the WeChat application and is in the IP form into a character device drive 505, and the data packet that is of the WeChat application and is in the IP form enters the kernel mode from the user mode. The character device drive 505 writes the data packet that is of the WeChat application and is in the IP form into a virtual interface 506, and the virtual interface 506 routes the data packet that is of the WeChat application and is in the IP form to a WeChat application process 507 by using a TCP/IP protocol stack 503.

It is assumed that the data packet that is of the Youku video application and is sent by the wireless local area network is received through a wireless local area network interface 502, and the client application 504 acquires the data packet of the Youku video application through a socket (socket) interface established in the wireless local area network. The client application 504 converts, by using a data proxy (Proxy), the data packet of the Youku video application into a data packet that is of the Youku video application and is in an IP form. The client application 504 writes the data packet that is of the Youku video application and is in the IP form into the character device drive 505, and the data packet that is of the Youku video application and is in the IP form enters the kernel mode from the user mode. The character device drive 505 writes the data packet that is of the Youku video application and is in the IP form into the virtual interface 506, and the virtual interface 506 routes the data packet that is of the Youku video application and is in the IP form to a Youku video application process 507 by using the TCP/IP protocol stack 503. A data packet received by the virtual interface 506 includes the data packet sent by the cellular network accessed by using the first APN and the data packet sent by the wireless local area network.

It should be noted that, the Youku video application and WeChat application in the assumption in this embodiment of the present invention are merely exemplary descriptions, and in actual application, there may further be another data service application. In addition, the data packets of the Youku video application and the WeChat application may be simultaneously transmitted in the cellular network accessed by using the first APN, and may also be simultaneously transmitted in the wireless local area network, which is not limited in this embodiment of the present invention.

The data processing method provided in this embodiment of the present invention is applied to an intelligent terminal. After accessing a wireless local area network, the intelligent terminal establishes a first APN, where the first APN is different from a default APN of the intelligent terminal, accesses a cellular network by using the first APN, and performs, in the wireless local area network or the cellular network accessed by using the first APN, transmission of a data service of the intelligent terminal according to an offloading policy and a time for, the wireless local area network or the cellular network accessed by using the first APN, to respond to the data service. Compared with the prior art, in the data processing method in this embodiment of the present invention, a user may not modify an operating system on a read-only memory (ROM) of the intelligent terminal, and does not need to acquire administrator rights of the intelligent terminal, so that when the intelligent terminal connects to the wireless local area network, even if a connection, to the cellular network, established by using a default APN is disconnected, the intelligent terminal can still access the cellular network, which enables the intelligent terminal to have a network concurrent function, thereby effectively improving generality of the network concurrent function on the intelligent terminal, implementing intelligence and refinement of data service transmission in the wireless local area network or the cellular network accessed by using the first APN, and implementing load balancing of a data stream of the intelligent terminal.

Figure 6:
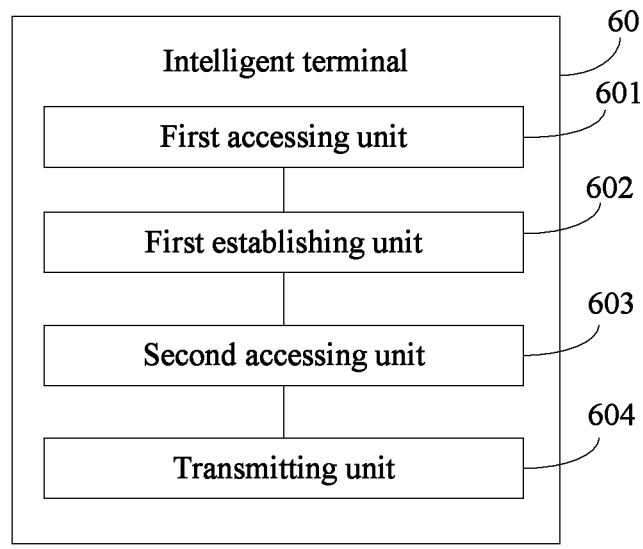
FIG. 6 is schematic structural diagram of an intelligent terminal according to an embodiment of the present invention.

An embodiment of the present invention provides an intelligent terminal 60, as shown in FIG. 6, including:

a first accessing unit 601, configured to access a wireless local area network;

a first establishing unit 602, configured to establish a first APN, where the first APN is different from a default APN of the intelligent terminal, and the first APN is used to implement data service access to a cellular network when the wireless local area network is accessed;

a second accessing unit 603, configured to access the cellular network by using the first APN; and a transmitting unit 604, configured to perform, in the wireless local area network or the cellular network accessed by using the first APN, transmission of a data service of the intelligent terminal.

In this way, after accessing a wireless local area network, an intelligent terminal establishes a first APN, accesses a cellular network by using the first APN, and performs, in the wireless local area network and the cellular network accessed by using the first APN, transmission of a data service. Compared with the prior art, a user may not modify an operating system on a read-only memory (ROM) of the intelligent terminal, and does not need to acquire administrator rights of the intelligent terminal, so that when the intelligent terminal connects to the wireless local area network, even if a connection, to the cellular network, established by using a default APN is disconnected, the intelligent terminal can still access the cellular network, which enables the intelligent terminal to have a network concurrent function, thereby improving generality of the network concurrent function on the intelligent terminal.

Figure 7:
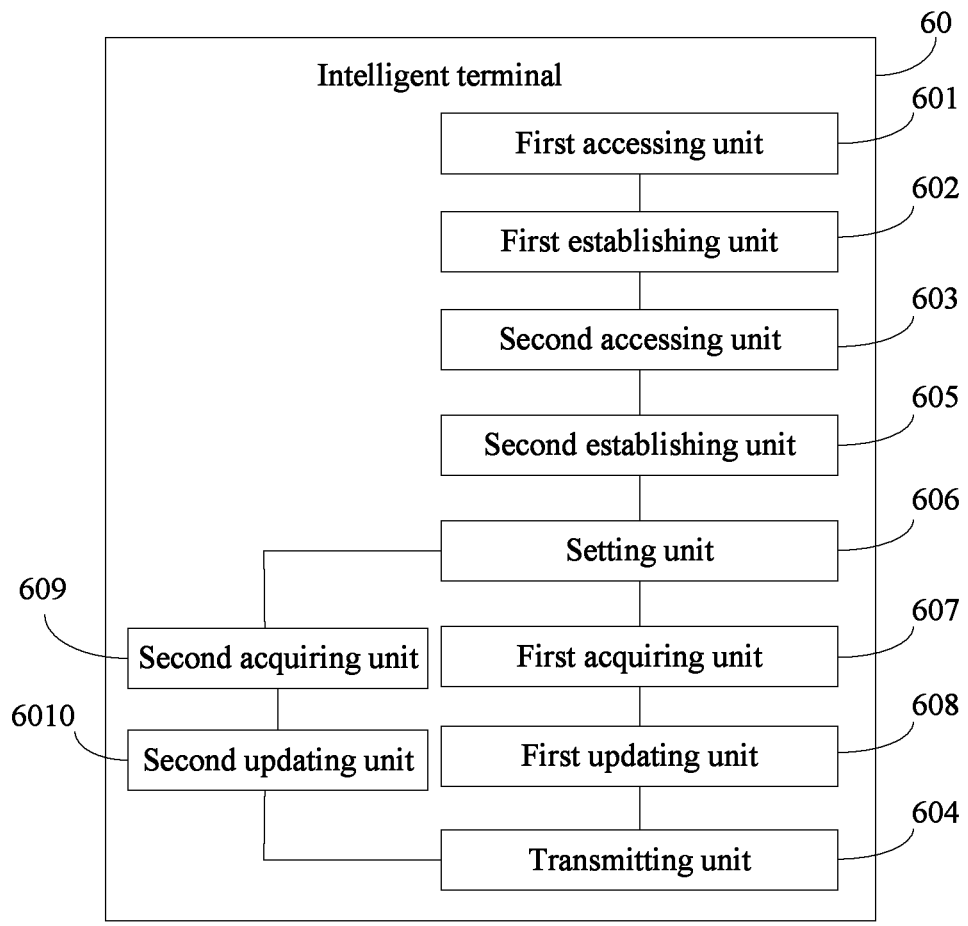
FIG. 7 is schematic structural diagram of another intelligent terminal according to an embodiment of the present invention.

As shown in FIG. 7, the intelligent terminal 60 further includes:

a second establishing unit 605, configured to establish a virtual interface, so that the data service can be transmitted, through the virtual interface, to an interface of the wireless local area network or an interface of the cellular network accessed by using the first APN; and a setting unit 606, configured to set an Internet Protocol IP routing table, where a default route recorded in the IP routing table is a private IP address of the virtual interface.

The transmitting unit 604 is specifically configured to:
route the data service to the virtual interface according to the IP routing table;

determine a first data packet and a second data packet according to an offloading policy, where the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;

transmit the first data packet from the virtual interface to the interface of the cellular network accessed by using the first APN, so that the first data packet is transmitted to the cellular network accessed by using the first APN through the interface of the cellular network accessed by using the first APN; and transmit the second data packet from the virtual interface to the wireless local area network interface, so that the second data packet is transmitted to the wireless local area network through the wireless local area network interface.

The intelligent terminal 60 further includes:
a first acquiring unit 607, configured to acquire a time for the cellular network, accessed by using the first APN, to respond to a first data service, where the first data service is any one of data services running on the intelligent terminal, and a data service type corresponding to the first data service is the data service type of the data service that currently needs to be transmitted by using the cellular network accessed by using the first APN; and a first updating unit 608, configured to: if the time for the cellular network, accessed by using the first APN, to respond to the first data service is greater than or equal to a first threshold, update the offloading policy, so that in an updated offloading policy, a data service type corresponding to the first data service is the data service type of the data service that currently needs to be transmitted by using the wireless local area network.

The intelligent terminal 60 further includes:
a second acquiring unit 609, configured to acquire a time for the wireless local area network to respond to a second data service, where the second data service is any one of data services running on the intelligent terminal, and a data service type corresponding to the second data service is the data service type of the data service that currently needs to be transmitted by using the wireless local area network; and a second updating unit 6010, configured to: if the time for the wireless local area network to respond to the second data service is greater than or equal to a second threshold, update the offloading policy, so that in an updated offloading policy, a data service type corresponding to the second data service is the data service type of the data service that currently needs to be transmitted by using the cellular network accessed by using the first APN.

The transmitting unit 604 is specifically configured to:
receive, through the interface of the cellular network accessed by using the first APN, a data packet sent by the cellular network accessed by using the first APN;

receive, through the wireless local area network interface, a data packet sent by the wireless local area network;

write the data packet sent by the cellular network accessed by using the first APN into the virtual interface;

write the data packet sent by the wireless local area network into the virtual interface; and route a data packet received by the virtual interface to the corresponding data service process, where the data packet received by the virtual interface includes the data packet sent by the cellular network accessed by using the first APN and the data packet sent by the wireless local area network.

Figure 8:
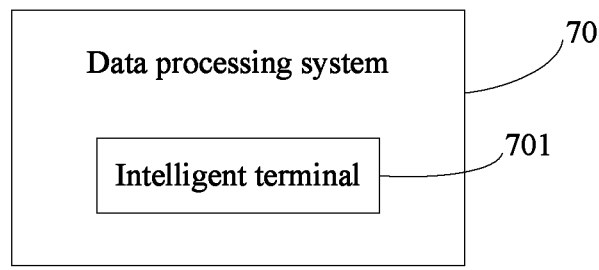
FIG. 8 is a schematic diagram of a data processing system according to an embodiment of the present invention.

An embodiment of the present invention provides a data processing system 70, as shown in FIG. 8, including:
an intelligent terminal 701, where the intelligent terminal 701 is configured to: access a wireless local area network; establish a first APN, where the first APN is different from a default APN of the intelligent terminal, and the first APN is used to implement data service access to a cellular network when the wireless local area network is accessed; access the cellular network by using the first APN; and perform, in the wireless local area network and the cellular network accessed by using the first APN, transmission of a data service of the intelligent terminal.

Figure 9:
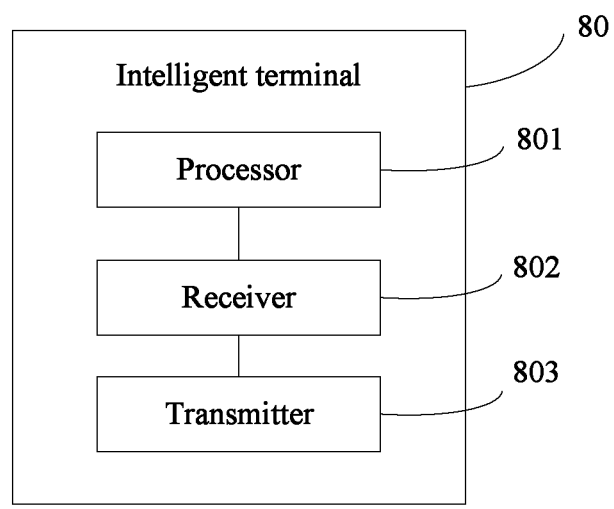
FIG. 9 is schematic structural diagram of still another intelligent terminal according to an embodiment of the present invention.

An embodiment of the present invention provides an intelligent terminal 80, as shown in FIG. 9, including a processor 801, a receiver 802, and a transmitter 803.

The processor 801 is configured to access a wireless local area network.

The processor 801 is further configured to establish a first APN, where the first APN is different from a default APN of the intelligent terminal, and the first APN is used to implement data service access to a cellular network when the wireless local area network is accessed.

The processor 801 is further configured to access the cellular network by using the first APN.

The receiver 802 and the transmitter 803 are configured to perform, in the wireless local area network and the cellular network accessed by using the first APN, transmission of a data service of the intelligent terminal.

In this way, after accessing a wireless local area network, an intelligent terminal establishes a first APN, accesses a cellular network by using the first APN, and performs, in the wireless local area network and the cellular network accessed by using the first APN, transmission of a data service. Compared with the prior art, a user may not modify an operating system on a read-only memory (ROM) of the intelligent terminal, and does not need to acquire administrator rights of the intelligent terminal, so that when the intelligent terminal connects to the wireless local area network, even if a connection, to the cellular network, established by using a default APN is disconnected, the intelligent terminal can still access the cellular network, which enables the intelligent terminal to have a network concurrent function, thereby improving generality of the network concurrent function on the intelligent terminal.

The processor 801 is further configured to establish a virtual interface, so that the data service can be transmitted, through the virtual interface, to an interface of the wireless local area network or an interface of the cellular network accessed by using the first APN.

The processor 801 is further configured to set an Internet Protocol IP routing table, where a default route recorded in the IP routing table is a private IP address of the virtual interface.

The processor 801 is specifically configured to:
route the data service to the virtual interface according to the IP routing table;
determine a first data packet and a second data packet according to an offloading policy, where the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;
transmit the first data packet from the virtual interface to the interface of the cellular network accessed by using the first APN, so that the first data packet is transmitted to the cellular network accessed by using the first APN through the interface of the cellular network accessed by using the first APN; and transmit the second data packet from the virtual interface to the wireless local area network interface, so that the second data packet is transmitted to the wireless local area network through the wireless local area network interface.

The processor 801 is further configured to acquire a time for the cellular network, accessed by using the first APN, to respond to a first data service, where the first data service is any one of data services running on the intelligent terminal, and a data service type corresponding to the first data service is the data service type of the data service that currently needs to be transmitted by using the cellular network accessed by using the first APN.

The processor 801 is further configured to: if the time for the cellular network, accessed by using the first APN, to respond to the first data service is greater than or equal to a first threshold, update the offloading policy, so that in an updated offloading policy, a data service type corresponding to the first data service is the data service type of the data service that currently needs to be transmitted by using the wireless local area network.

The processor 801 is further configured to acquire a time for the wireless local area network to respond to a second data service, where the second data service is any one of data services running on the intelligent terminal, and a data service type corresponding to the second data service is the data service type of the data service that currently needs to be transmitted by using the wireless local area network.

The processor 801 is further configured to: if the time for the wireless local area network to respond to the second data service is greater than or equal to a second threshold, update the offloading policy, so that in an updated offloading policy, a data service type corresponding to the second data service is the data service type of the data service that currently needs to be transmitted by using the cellular network accessed by using the first APN.

The receiver 802 is further configured to receive, through the interface of the cellular network accessed by using the first APN, a data packet sent by the cellular network accessed by using the first APN.

The receiver 802 is further configured to receive, through the wireless local area network interface, a data packet sent by the wireless local area network.

The processor 801 is further configured to write the data packet sent by the cellular network accessed by using the first APN into the virtual interface.

The processor 801 is further configured to write the data packet sent by the wireless local area network into the virtual interface.

The processor 801 is further configured to route a data packet received by the virtual interface to the corresponding data service process, where the data packet received by the virtual interface includes the data packet sent by the cellular network accessed by using the first APN and the data packet sent by the wireless local area network.

Figure 10:
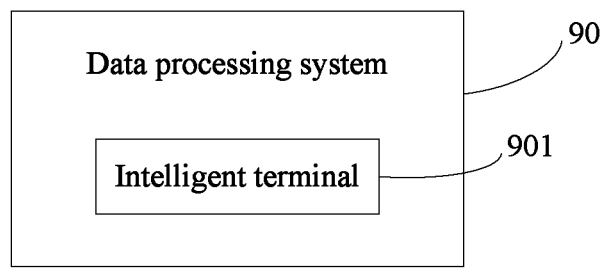
FIG. 10 is a schematic diagram of another data processing system according to an embodiment of the present invention.

An embodiment of the present invention provides a data processing system 90, as shown in FIG. 10, including:
an intelligent terminal 901, where the intelligent terminal 901 is configured to: access a wireless local area network; establish a first APN, where the first APN is different from a default APN of the intelligent terminal, and the first APN is used to implement data service access to a cellular network when the wireless local area network is accessed; access the cellular network by using the first APN; and perform, in the wireless local area network and the cellular network, transmission of a data service of the intelligent terminal.

In this embodiment of the present invention, an intelligent terminal is provided. After accessing a wireless local area network, the intelligent terminal establishes a first APN, where the first APN is different from a default APN of the intelligent terminal, accesses a cellular network by using the first APN, and performs, in the wireless local area network and the cellular network accessed by using the first APN, transmission of a data service of the intelligent terminal according to an offloading policy and a time for, the wireless local area network or the cellular network accessed by using the first APN, to respond to the data service. Compared with the prior art, by using the intelligent terminal of this embodiment of the present invention, a user may not modify an operating system on a read-only memory (ROM) of the intelligent terminal, and does not need to acquire administrator rights of the intelligent terminal, so that when the intelligent terminal connects to the wireless local area network, even if a connection, to the cellular network, established by using a default APN is disconnected, the intelligent terminal can still access the cellular network, which enables the intelligent terminal to have a network concurrent function, thereby effectively improving generality of the network concurrent function on the intelligent terminal, and implementing intelligence and refinement of data service transmission on the wireless local area network and the cellular network.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method, applied to an intelligent terminal, comprising:
   accessing, by a intelligent terminal, a wireless local area network;
   establishing, by the intelligent terminal, a first access point name (APN), wherein the first APN is different from a default APN of the intelligent terminal, and the first APN is used to implement data service access to a cellular network when the wireless local area network is accessed;
   accessing, by the intelligent terminal, the cellular network by using the first APN; and
   performing, by the intelligent terminal, in the wireless local area network and the cellular network accessed by using the first APN, transmission of a data service of the intelligent terminal, wherein:
   before the performing, in the wireless local area network and the cellular network accessed by using the first APN, transmission of a data service of the intelligent terminal, the method further comprises:
   establishing a virtual interface, so that the data service can be transmitted, through the virtual interface, to a wireless local area network interface or a cellular network interface of the cellular network accessed by using the first APN; and
   setting an Internet Protocol IP routing table, wherein a default next-hop address recorded in the IP routing table is a private IP address of the virtual interface.

2. The method according to claim 1, wherein:
   the performing, in the wireless local area network and the cellular network accessed by using the first APN, transmission of a data service of the intelligent terminal comprises:
   routing the data service to the virtual interface according to the IP routing table;
   determining a first data packet and a second data packet according to an offloading policy, wherein the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;
   transmitting the first data packet from the virtual interface to the cellular network interface accessed by using the first APN, so that the first data packet is transmitted to the cellular network accessed by using the first APN through the cellular network interface accessed by using the first APN; and
   transmitting the second data packet from the virtual interface to the wireless local area network interface, so that the second data packet is transmitted to the wireless local area network through the wireless local area network interface.

3. The method according to claim 2, wherein:
before the determining a first data packet and a second data packet according to an offloading policy, the method further comprises:
acquiring a time for the cellular network, accessed by using the first APN, to respond to a first data service, wherein the first data service is any one of data services running on the intelligent terminal, and a data service type corresponding to the first data service is the data service type of the data service that currently needs to be transmitted by using the cellular network accessed by using the first APN; and
if the time for the cellular network, accessed by using the first APN, to respond to the first data service is greater than or equal to a first threshold, updating the offloading policy, so that in an updated offloading policy, a data service type corresponding to the first data service is the data service type of the data service that currently needs to be transmitted by using the wireless local area network.

4. The method according to claim 2, wherein:
before the determining a first data packet and a second data packet according to an offloading policy, the method further comprises:
acquiring a time for the wireless local area network to respond to a second data service, wherein the second data service is any one of data services running on the intelligent terminal, and a data service type corresponding to the second data service is the data service type of the data service that currently needs to be transmitted by using the wireless local area network; and
if the time for the wireless local area network to respond to the second data service is greater than or equal to a second threshold, updating the offloading policy, so that in an updated offloading policy, a data service type corresponding to the second data service is the data service type of the data service that currently needs to be transmitted by using the cellular network accessed by using the first APN.

5. The method according to claim 1, wherein:
the performing, in the wireless local area network and the cellular network accessed by using the first APN, transmission of a data service of the intelligent terminal comprises:
receiving, through the cellular network interface accessed by using the first APN, a data packet sent by the cellular network accessed by using the first APN;
receiving, through the wireless local area network interface, a data packet sent by the wireless local area network;
writing the data packet sent by the cellular network accessed by using the first APN into the virtual interface;
writing the data packet sent by the wireless local area network into the virtual interface; and
routing a data packet received by the virtual interface to a corresponding data service process, wherein the data packet received by the virtual interface comprises the data packet sent by the cellular network accessed by using the first APN and the data packet sent by the wireless local area network.

6. An intelligent terminal, comprising:
a first accessing unit, configured to access a wireless local area network;
a first establishing unit, configured to establish a first access point name APN, wherein the first APN is different from a default APN of the intelligent terminal, and the first APN is used to implement data service access to a cellular network when the wireless local area network is accessed;
a second accessing unit, configured to access the cellular network by using the first APN;
a transmitting unit, configured to perform, in the wireless local area network and the cellular network accessed by using the first APN, transmission of a data service of the intelligent terminal;
a second establishing unit, configured to establish a virtual interface, so that the data service can be transmitted, through the virtual interface, to a wireless local area network interface or a cellular network interface accessed by using the first APN; and
a setting unit, configured to set an Internet Protocol IP routing table, wherein a default next-hop address recorded in the IP routing table is a private IP address of the virtual interface.

7. The intelligent terminal according to claim 6, wherein:
the transmitting unit is configured to:
route the data service to the virtual interface according to the IP routing table;
determine a first data packet and a second data packet according to an offloading policy, wherein the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;
transmit the first data packet from the virtual interface to the cellular network interface accessed by using the first APN, so that the first data packet is transmitted to the cellular network accessed by using the first APN through the cellular network interface accessed by using the first APN; and
transmit the second data packet from the virtual interface to the wireless local area network interface, so that the second data packet is transmitted to the wireless local area network through the wireless local area network interface.

8. The intelligent terminal according to claim 7, wherein:
the intelligent terminal further comprises:
a first acquiring unit, configured to acquire a time for the cellular network, accessed by using the first APN, to respond to a first data service, wherein the first data service is any one of data services running on the intelligent terminal, and a data service type corresponding to the first data service is the data service type of the data service that currently needs to be transmitted by using the cellular network accessed by using the first APN; and
a first updating unit, configured to: if the time for the cellular network, accessed by using the first APN, to respond to the first data service is greater than or equal to a first threshold, update the offloading policy, so that in an updated offloading policy, a data service type corresponding to the first data service is the data service type of the data service that currently needs to be transmitted by using the wireless local area network.

9. The intelligent terminal according to claim 7, wherein:
the intelligent terminal further comprises:
a second acquiring unit, configured to acquire a time for the wireless local area network to respond to a second data service, wherein the second data service is any one of data services running on the intelligent terminal, and a data service type corresponding to the second data service is the data service type of the data service that currently needs to be transmitted by using the wireless local area network; and
a second updating unit, configured to: if the time for the wireless local area network to respond to the second data service is greater than or equal to a second threshold, update the offloading policy, so that in an updated offloading policy, a data service type corresponding to the second data service is the data service type of the data service that currently needs to be transmitted by using the cellular network accessed by using the first APN.

10. The intelligent terminal according to claim 6, wherein:
the transmitting unit is configured to:
receive, through the cellular network interface accessed by using the first APN, a data packet sent by the cellular network accessed by using the first APN;
receive, through the wireless local area network interface, a data packet sent by the wireless local area network;
write the data packet sent by the cellular network accessed by using the first APN into the virtual interface;
write the data packet sent by the wireless local area network into the virtual interface; and
route a data packet received by the virtual interface to the corresponding data service process, wherein the data packet received by the virtual interface comprises the data packet sent by the cellular network accessed by using the first APN and the data packet sent by the wireless local area network.

11. A data processing system comprising:
an intelligent terminal, comprising:
 a memory to store instructions; and
 a processor to execute the instructions to configure the processor to:
  access a wireless local area network;
  establish a first access point name APN, wherein the first APN is different from a default APN of the intelligent terminal, and the first APN is used to implement data service access to a cellular network when the wireless local area network is accessed;
  access the cellular network by using the first APN;
  establish a virtual interface, so that the data service can be transmitted, through the virtual interface, to a wireless local area network interface or a cellular network interface accessed by using the first APN; and
  set an Internet Protocol IP routing table, wherein a default next-hop address recorded in the IP routing table is a private IP address of the virtual interface; and
 a transmitter configured to perform, in the wireless local area network and the cellular network accessed by using the first APN, transmission of a data service of the intelligent terminal.

12. The data processing system according to claim 11, wherein:
the transmitter is configured to:
route the data service to the virtual interface according to the IP routing table;
determine a first data packet and a second data packet according to an offloading policy, wherein the first data packet is a data packet that needs to be transmitted by using the cellular network accessed by using the first APN, the second data packet is a data packet that needs to be transmitted by using the wireless local area network, and the offloading policy records a data service type of a data service that currently needs to be transmitted by using the cellular network accessed by using the first APN and a data service type of a data service that currently needs to be transmitted by using the wireless local area network;
transmit the first data packet from the virtual interface to the cellular network interface accessed by using the first APN, so that the first data packet is transmitted to the cellular network accessed by using the first APN through the cellular network interface accessed by using the first APN; and
transmit the second data packet from the virtual interface to the wireless local area network interface, so that the second data packet is transmitted to the wireless local area network through the wireless local area network interface.

13. The data processing system according to claim 12, wherein:
the processor is further configured to:
acquire a time for the cellular network, accessed by using the first APN, to respond to a first data service, wherein the first data service is any one of data services running on the intelligent terminal, and a data service type corresponding to the first data service is the data service type of the data service that currently needs to be transmitted by using the cellular network accessed by using the first APN; and
when the time for the cellular network, accessed by using the first APN, to respond to the first data service is greater than or equal to a first threshold, update the offloading policy, so that in an updated offloading policy, a data service type corresponding to the first data service is the data service type of the data service that currently needs to be transmitted by using the wireless local area network.

14. The data processing system according to claim 12, wherein:
the processor is further configured to:
acquire a time for the wireless local area network to respond to a second data service, wherein the second data service is any one of data services running on the intelligent terminal, and a data service type corresponding to the second data service is the data service type of the data service that currently needs to be transmitted by using the wireless local area network; and
when the time for the wireless local area network to respond to the second data service is greater than or equal to a second threshold, update the offloading policy, so that in an updated offloading policy, a data service type corresponding to the second data service is the data service type of the data service that currently needs to be transmitted by using the cellular network accessed by using the first APN.

15. The data processing system according to claim 11, wherein:
the transmitter is configured to:
receive, through the cellular network interface accessed by using the first APN, a data packet sent by the cellular network accessed by using the first APN;

receive, through the wireless local area network interface, a data packet sent by the wireless local area network;

write the data packet sent by the cellular network accessed by using the first APN into the virtual interface;

write the data packet sent by the wireless local area network into the virtual interface; and route a data packet received by the virtual interface to the corresponding data service process, wherein the data packet received by the virtual interface comprises the data packet sent by the cellular network accessed by using the first APN and the data packet sent by the wireless local area network.

* * * * *